United States Patent Office 3,446,764
Patented May 27, 1969

3,446,764
SOLVENT COMPOSITION FOR WATER REDUCIBLE RESIN DISPERSIONS
Gordon Phillips, Parkview, and Stephen T. Bowell, Cleveland, Ohio, assignors, by mesne assignments, to SCM Corporation, New York, N.Y., a corporation of New York
No Drawing. Filed Apr. 23, 1965, Ser. No. 450,530
Int. Cl. C08k *1/28;* C08g *51/34;* C08f *45/34*
U.S. Cl. 260—22     17 Claims

ABSTRACT OF THE DISCLOSURE

Novel water miscible solvent compositions comprising air dry surface coating resins dispersed in the solvent compositions have been discovered and are described. The solvent compositions comprise a mixture of:
(1) A major proportion of a water soluble lower alkoxy alkanol,
(2) A minor proportion of a lower aliphatic monohydric alcohol, and
(3) From about 0.5% to about 5.0%, by weight, of a compound of the formula

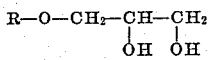

where R is an alkyl group containing from about 3 to about 6 carbon atoms. Coating resins and coating formulations dispersed in these solvents are also described. The solvent compositions and coating formulations are advantageous in that the presence of the alkyl ether of glycerol falling within the scope of the above formula tends to equalize the evaporation rate of water and other solvent components. A differential evaporation rate between water and other solvents causes a lack of homogeneity in dried coating and/or the formulation of a surface skin at the air interface of the coating which prevents drying of the surface interface and often causes the coating film to lift from the coated surface. The compositions are further advantageous in that they are water miscible; that is, they are infinitely dilutable with water and are soluble in any proportion with water.

---

The present invention relates to novel solvent compositions and to compositions comprising air dry surface coating resins dispersed in these solvent compositions. The invention more particularly relates to novel water miscible organic solvent compositions having resins dispersed therein which are useful in the formulation of coating compositions such as paints, varnishes, lacquers, and the like.

The use of organic solvents as dispersing agents for air dry surface coating resins is well known. By way of example ethylene glycol monobutyl ether and butanol in admixture has been used as a solvent for oil modified alkyd resins. Also the use of diethylene glycol monoethyl ether as a solvent or dispersing agent in conjunction with alkanols such as methanol, ethanol, isopropanol, n-butanol, etc. is known.

The present invention provides novel solvent compositions which have distinct advantages over the known compositions in that they are relatively non-toxic, have a lower odor and, when air dry surface coating resins are dispersed therein, form films which dry evenly with gloss, can be lapped without disclosing the point of lap and are not lifted or removed when an application of a second coat of the resin dispersion is applied over a previously dried resin coating.

The solvent compositions of this invention overcome a problem on which extensive efforts have been made, e.g. to produce solvents and solvent-resin dispersions having desirable properties for use in surface coating applications. Prior to the solvent compositions of the present invention suitable and superior air dry surface coatings have been produced only by the use of emulsions or latex emulsions where the liquid vehicle has consisted substantially of water. For reasons of flexibility in formulations and storage stability a suitable water miscible organic solvent which may be incorporated in air dry paint formulations is of very great interest to the coatings industry.

The present invention provides solvent compositions comprising a mixture of known organic solvents such as a lower alkoxy lower alkanol (sometimes hereinafter referred to as an alkyl ether of lower alkanol), a lower aliphatic alcohol and, in addition a small amount of certain hereinafter defined alkyl ethers of glycerol which, surprisingly effect the drying of resin dispersions containing these solvents in such a manner as to provide air dry resin coatings having the hereinbefore described advantages. A wide variety of air dry surface coating resins can be dispersed in these solvents in amounts of up to about 90% by weight, to provide advantageous formulation components for coating and film forming compositions.

The solvent compositions of the present invention are water miscible, that is, they are infinitely dilutable with water and are soluble in any proportion with water. Also, a wide variety of resins when dispersed or dissolved in compositions of this invention can be infinitely diluted with water to provide clear, transparent liquid dispersions which are or have the appearance of solutions.

The novel water miscible solvent compositions of this invention comprise a mixture of (1) a major proportion of a water soluble lower alkoxy alkanol, (2) a minor proportion of a lower aliphatic monohydric alcohol and (3) from about 0.5% to about 5.0%, by weight, of a compound of the formula

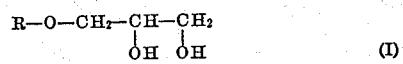

where R is an alkyl group containing from about 3 to about 6 carbon atoms.

The above solvent compositions can be used to disperse a wide variety of resins and in certain hereinafter defined instances, can form the basis of water reducible resin dispersions which are useful in formulating water based paints which provide a glossy or semi-glossy appearance when applied to surfaces. Many conventional film-forming resins, capable of air-drying are suitable for dispersion in the solvent compositions of this invention with advantageous effect. Examples of such resins include alkyds such as epoxy-modified alkyds, oil extended alkyds, epoxy-modified oil-extended alkyds, unsaturated polyester, polystyrene, and other resins collectively considered in the art as "air-drying film-forming or coating resins." The term "air-dry" as used herein is intended to mean the ability of the coating composition to form a rigid solid film when exposed to the atmosphere at ordinary temperatures, particularly 50°–100° F.

Examples of compositions falling within the scope of Formula I are lower alkyl ethers of glycerol, preferably lower alkyl ethers of glycerol in which R is an alkyl group containing from 3 to 6 carbon atoms. Thus, R in Formula I may be a propyl, isopropyl, n-propyl, n-butyl, t-butyl, sec-butyl, primary, secondary or tertiary pentyl, or a primary, secondary or tertiary hexyl group. Specific examples of compounds falling within the scope of the above formula which are useful include propyl, isopropyl, n-propyl, n-butyl, t-butyl, sec-butyl, primary, secondary and tertiary pentyl, and primary, secondary and tertiary hexylethers of glycerol.

Although any one or more of the above described alkyl ethers of glycerol may be employed in the solvent compositions of this invention, the butyl, pentyl and hexyl ethers of glycerol are preferred, since these ethers tend to prevent the "skinning" (e.g., the formation of a skin on the surface of a resin film which is formed when a resin disperson is applied to surfaces). Such surface skin often prevents the residual solvent in the lower portions of the film from evaporating causing prolonged drying times of the film and tending to produce films which do not adhere well to surfaces. When the alkyl ethers of glycerol are mixed with the hereinafter defined water-soluble lower alkoxy lower alkanols and lower alkanols, solvents having the aforedescribed effects are formed.

The water soluble lower alkoxy lower alkanols which may be suitably employed in the composition of the present invention can be designated by the formua

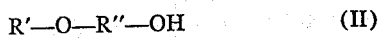
$$R'-O-R''-OH \qquad (II)$$

where R' is an alkyl group of from 1 to 5 carbon atoms and R" is an alkyl group containing from 2 to 4 carbon atoms.

Specific compounds falling within the scope of Formula II, which have been found advantageous for use in the solvent compositions of the present invention include methoxy ethanol, ethoxy ethanol, isopropoxy ethanol, butoxy ethanol, methoxy propanol, n-propoxy propanol, methoxy ethoxy ethanol, butoxy ethoxy ethanol, methoxy propoxy propanol, 3 methoxy butanol and 3-ethoxy 1-propanol. The water soluble lower alkoxy lower alkanol employed may include a mixture of one or more of the foregoing organic lower alkoxy lower alkanols and, as will be hereinafter evident, mixtures of two or more of these liquids have been found to be particularly advantageous in eliminating odor problems commonly associated with conventional resin solvents.

Lower aliphatic alcohols which may be suitably employed in the solvent compositions of this invention include, for example, methyl, ethyl, isopropyl, n-propyl, sec-butyl, primary, secondary and tertiary amyl, primary, secondary and tertiary hexyl alcohols. Mixtures of one or more of any of these alcohols can advantageously be used in the solvent compositions.

The amount of the lower alkyl ether of glycerol which may be employed in the compositions of this invention may vary considerably and will usually depend upon the particular resin dispersion which it is desired to prepare. Generally the amount of such ether of glycerol will be in the range of from about 0.5% to about 5.0%, by weight, of the solvent composition. Where it is desired to employ the solvent in a rapid drying lacquer composition, such as, for example, in nitrocellulose lacquers, a smaller amount usually from about 0.5% to about 1.0%, by weight, is sufficient. On the other hand when it is desirable to employ the solvent in water based paint or water thinnable paints or enamels, from about 1% to about 5%, by weight, of one or more of the hereinbefore described alkyl ethers of glycerol is desirable. If less than about 0.5% by weight is employed the formation of a skin in resin coating formulations which are applied to surfaces will usually not be prevented. If more than about 5% by weight of the material is employed prolonged drying times will be encountered when resin dispersions containing the solvent composition are used in coating compositions. Solvent compositions containing from about 1% to about 3%, by weight, of an alkyl ether of glycerol have been found to be particularly advantageous in resin dispersions which are intended for use in water based or water reducible paints containing air drying surface coating resins. If the alkyl ether of glycerol is omitted from such formulations the solvent usually evaporates more rapidly than the water resulting in a precipitation of the resin in the watery film and continuous non-homogeneous coatings result. Surprisingly when small amounts of an alkyl ether of glycerol are included in the solvent and a solvent resin dispersion is employed in a water reducible paint formulation the resin remains in a substantially dispersed state and forms a substantially homegeneous gel which then dries to a hard coating.

As noted hereinbefore the solvent compositions of this invention comprise a major portion of a water soluble lower alkoxy alkanol. The exact amount of this material which is employed will vary depending on the kind and amount of resin which it is desired to disperse and the average molecular weight of the resin. For example, resins such as nitrocellulose which are usually quite soluble in organic solvents generally require less of the lower alkoxy lower alkanols than resins such as polyesters, alkyds, oil modified alkyds and epoxy modified alkyd resins which are less soluble. Oil modified alkyds and epoxy modified alkyds tend to be less soluble or less dispersible in organic solvents than resins such as nitrocellulose or polyesters. When converted into a more soluble form by the use of alkaline materials such alkyds require substantial amounts of organic solvents if the resins are to be made dilutable or infinitely dilutable with water.

It has been found generally desirable to employ from about 60% to about 90%, by weight, of any of the hereinbefore defined lower alkoxy lower alkanols in the solvent compositions of the present invention. If less than about 60%, by weight, of the alkoxy alkanol is employed, the resin-solvent dispersion formed will usually not be infinitely dilutable with water. On the other hand if more than about 90% by weight of the lower alkoxy lower alkanol is employed prolonged drying times are encountered when the resin-solvent dispersion is applied to a surface or is incorporated in coating compositions such as paints. Some lower alkoxy lower alkanols generally are somewhat less volatile (that is they have a lower vapor pressure) and films resulting from such dispersions sometimes remain tacky and are subject to environmental attack during this period of prolonged drying.

The amount of lower aliphatic alcohol which may be employed in the solvent compositions of this invention may also vary widely and will depend upon the particular resin dispersion which it is desirable to obtain. Generally speaking resins are much less soluble in lower aliphatic alcohols than in lower alkoxy lower alkanols although film forming resins such as nitrocellulose and unsaturated polyesters are soluble to a greater extent than the alkyd resins. It has been found generally advantageous to employ from about 9.5% to about 35%, by weight, of lower aliphatic alcohol in the solvent compositions with this invention. If less than about 9.5%, by weight of the lower aliphatic alcohol is employed, solvent-resin dispersions will have prolonged drying times, resulting in disadvantages hereinbefore described. If more than about 35% of lower aliphatic alcohol is employed there is some danger that resins, particularly epoxy modified or oil modified alykd resins, will not be adequately dispersed and will precipitate when the dispersion is diluted with water.

One embodiment of a composition of this invention comprises from about 60% to about 90%, by weight, of a lower alkoxy lower alkanol, preferably n-propoxy propanol and from about 35% to about 9.5%, by weight, of a lower aliphatic alcohol, preferably n-propanol and/or isopropanol, the balance of the composition consisting substantially of any of the hereinbefore defined alkyd ethers of glycerol embraced by Formula I. Such solvent compositions have been found useful for preparing resin dispersions containing up to 75% by weight of oil modified alkyd, epoxy modified alkyd and oil-epoxy modified alkyd resins. Also when the above described resins are treated with an alkaline compound, such as an aliphatic amine prior to or after dispersions in the above solvent composition, they can often be incorporated in quantities as high as 80%, by weight, based on the weight of the dispersion and thereafter the resin solvent dispersion can usually be infinitely diluted with water and can be advantageously used in the formation of water based paints and enamels.

As noted hereinbefore, mixtures of the lower alkoxy lower alkanols and the lower aliphatic alcohols may be employed and, in instances where it is desired to use the solvent composition to disperse resins which have a high molecular weight and/or are inherently relatively insoluble, mixtures of the aforementioned components have been found to be particularly desirable. By way of example, one embodiment of a solvent composition of this invention which has been found advantageous, when a solvent-resin dispersion contains resins which have low solubility in organic liquids, and are substantially water insoluble, comprises from about 50% to about 60%, by weight, of n-propoxy propanol, from about 10% to about 30%, by weight, of 3-ethoxy 1-propanol, from about 35% to about 30%, by weight, of n-propanol, isopropanol or a mixture thereof, the balance of the solvent composition consisting substantially of the pentyl ether of glycerol.

The hereinbefore described solvent compositions can be used to disperse a wide variety of film-forming or coating resins, such as, for example, the resins described in co-pending U.S. patent application Ser. No. 450,541, filed simultaneously with the present application and assigned to the same assignee as the assignee of the present application. Examples of film forming resins which can be dispersed in the solvent compositions include cellulose derivatives such as nitro-cellulose, cellulose acetate, cellulose butyrate, and the like, unsaturated polyesters, alkyds including oil modified alkyds, epoxy modified alkyds, oil-epoxy modified alkyds, acrylate coating resins including alkyl acrylates, epoxide resins, film forming phenol-formaldehyde resins, benzoguanamine-formaldehyde resins, vinyl coating resins, polystyrene, styrene copolymers, chlorinated rubber, rosin and rosin esters.

The quantity of resin which may be dispersed in the solvent compositions of this invention depends in part on the particular composition and the particular resin or polymer involved. Generally speaking, from about 30% to about 75% by weight of film-forming or coating polymeric compounds or resins may be dispersed in the solvent compositions of this invention. By way of example, it has been found possible to disperse up to 75% by weight of an epoxy modified alkyd resin such as those described in the aforementioned co-pending U.S. patent application in the solvent compositions hereinbefore described. Where it is intended to use the resin in water-based paint or enamel formulations, the resin is usually suitably treated with a water soluble alkaline compound such as an alkali metal hydroxide, aliphatic amine or ammonia prior to or after its dispersion in the solvent composition of this invention.

Although natural film-forming resins such as shellac, and varnish components may be employed in the compositions of this invention, film forming synthetic resins such as those above described are preferred. Thus, for example, one embodiment of film-forming resin-solvent dispersion compositions of this invention comprises from about 30% to about 75% by weight of an air-drying film-forming synthetic resin and from about 70% to about 30% by weight of a solvent composition of this invention. In the above compositions, the synthetic resin is preferably an alkyd resin, more preferably an epoxy-modified alkyd resin. When it is desired to use the above described resin-solvent compositions as a basis for the formulation of water reducible paints or enamels, the composition will comprise an alkyd or epoxy modified alkyd resin which has been at least partially neutralized with a water soluble alkaline compound such as, for example, alkali metal hydroxide such as sodium or potassium hydroxide, an aliphatic amine such as trimethylamine, tri-ethylamine, ethylene diamine, dimethyl amino ethanol, tri-methanolamine, propanol amines, etc. or ammonia either in gaseous form or in aqueous solution as ammonium hydroxide. In a preferred embodiment, the resin-solvent dispersions comprise stable coating compositions containing a stable dispersion of from about 30% to about 70% by weight of an alkyd or an epoxy modified alkyd resin which has been at least partially neutralized with an aqueous solution of a water soluble alkaline compound and from about 70% to about 30% of a solvent such as hereinbefore described. Another preferred composition includes the above described coating composition to which has been added conventional pigments, fillers and toners, and an increased amount of water to provide an air drying water reducible paint or enamel having superior resistance to acid, ammonia and water, and which after drying for a short period of time will not be "lifted" since there is no appreciable "skinning" of the paint film.

A particularly advantageous embodiment of this invention comprises a resin solvent dispersion containing (A) from between about 50% to about 75%, by weight, of an epoxy modified alkyd resin having an acid value of between 20 and 90 and comprising the reaction product obtained by reacting (1) from about 1% to about 25%, by weight, of a glycidyl polyether of a dihydric phenol and (2) from about 5% to about 60% of a monocarboxylic fatty acid of a glyceride oil thereby forming a reaction mixture comprising a partial ester of the polyether and the monocarboxylic fatty acid. Such reaction mixture is then reacted with (3) from about 10% to about 50%, by weight, of a polycarboxylic acid, (4) from about 0.5 to about 1.5 mols, per mol of polycarboxylic acid, of a polyhydric alcohol, and (5) a hydroxyl substituted aliphatic acid of the formula

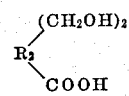

where $R_2$ is an alkylene group of from 1 to 4 carbon atoms. The above described resin is then dispersed in a solvent comprising (B) from about 60% to about 90%, by weight, of a lower alkoxy lower alkanol, from about 35% to about 9.5%, by weight, of a lower aliphatic alcohol, the balance of the composition consisting of a compound of the formula

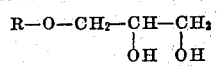

where R is an alkyl group containing from 3 to 6 carbon atoms. By so proceeding a resin solvent dispersion is obtained which is useful as a lacquer in the formation of clear, transparent, durable coatings.

The aforedescribed resin can be modified by the addition, prior to or after dispersion, of from about 1.0 to about 2.0 parts of an alkaline compound per 100 parts of resin. The alkaline compound is characterized having a low vapor pressure and is selected from the group consisting of an alkali metal hydroxide and an aliphatic amine. To the resultant product there is further added from about 0.6 to about 0.8 parts of ammonia per 100 parts of resin. By such addition there is formed a resin dispersion which is infinitely dilutable with water and which, when incorporated in water reducible paint formulations, will form coatings having the advantageous properties hereinbefore described.

A preferred embodiment of a resin-solvent dispersion suitable for use in water reducible paint formulations comprises (A) the reaction product obtained by reacting (1) from about 1% to about 25% of a glycidyl polyether of a dihydric phenol and (2) from about 5% to about 60%, by weight, of a mixture of tall oil and safflower oil fatty acids thereby forming a reaction mixture comprising a partial ester of the polyether and the fatty acids. Such reaction mixture is then reacted with (3) from about 50% to about 10%, by weight, of phthalic anhydride and (4) from about 0.5 to about 1.0 mols per mol of polycarboxylic acid of trimethylolethane and (5) from about 1.0 to about 0.5 mols, per mol of polycarboxylic acid, of dimethylol propionic acid. The above epoxy modified alkyd resin is then dispersed in n-propoxy propanol and to such dispersion there is added from about 1 to about 2 parts per 100 parts of reaction product of an alkali metal hydroxide and after such addition there is further added to the resin-solvent mixture from about 0.6 to about 0.8 parts per 100 parts of reaction product of ammonia. Other preferred ingredients hereinafter defined are added to the dispersion to form a water dispersible solvent resin composition.

The above described partially neutralized polyester resins or alkyd resins, which have been similarly neutralized and dispersed in the solvents in this invention, may be infinitely diluted with water to provide clear transparent dispersions or solutions. Such water dilutable dispersions, prior and after dilution with water, can be employed in the formulation of gloss and semi-gloss water based paints, in which case there is added to the dispersion, or to the water diluted dispersion, conventional paint ingredients such as pigments, inorganic fillers, extenders, tints, and the like.

Examples of pigments include, for example, rutile or anatase titania, lithopone titanium calcium, white lead, zinc oxide, lead zinc oxide and mixtures of the same.

Examples of inorganic fillers include kaolinite, fuller's earth, diatomaceous silica, etc.

Examples of tints or chromatic pigmentary materials include ferrite yellow oxide, ferric oxide, "brown" iron oxide (which is a blend of red, yellow and black iron oxide), tan oxide of iron, which is a similar blend, raw sienna and burnt sienna, raw and burnt umber, chromium oxide green, phthalocyanine green (chlorinated copper phthalonitrile), the green iron salt of nitroso beta-naphthol, copper phthalonitrile blue, ultramarine blue, carbon black, lamp black, toluidine red, parachlor red, paratoner (red), alkali-resistant red, BON red and maroon, cadmium reds and yellows, watchung red, madder lake (red), duratone red, carmine red, chrome yellow (lead chromate), chrome orange, hansa yellows (which are azo couplings of meta-nitroparatoluidine and acetoacetanilide) and golden nickel azo complexes such as those shown in U.S. Patent 2,396,327.

The above components or mixtures thereof can be conventionally incorporated with the resin solvent dispersions hereinbefore described. When so incorporated, they form water based paint or enamel compositions, having the advantages and/or properties hereinbefore described, and providing coatings with a durable glossy finish.

The following specific examples are intended to illustrate the invention but not to limit the scope thereof, parts and percentages being by weight unless otherwise specified.

EXAMPLE 1

Eight solvent compositions were prepared by intimately admixing the following organic liquids in the amounts illustrated below:

| Ingredients (kg.) | Composition number | | | | | | | |
|---|---|---|---|---|---|---|---|---|
| | 1 | 2 | 3 | 4 | 5 | 6 | 7 | 8 |
| n-Propoxy 2-propanol | 55.0 | 75.0 | | | | | 58.5 | |
| 3 methoxy butanol | | | 65.0 | | | | | |
| Isopropoxy ethanol | | | | | | | | |
| Butoxy ethoxy ethanol | | | | | | | | 41.7 |
| 3-methoxy 1-propanol | | | | | | | | |
| 3-ethoxy 1-propanol | | | 15.0 | 10.0 | 10.0 | 12.0 | 15.0 | 25.2 |
| 3-butoxy 1-propanol | | | | | | | | 42.0 |
| n-Propanol | 43.0 | | 3.5 | 12.0 | 6.0 | 7.0 | 6.0 | 4.9 | 4.9 |
| Isopropanol | | 5.0 | | 12.0 | 15.0 | 15.0 | 9.4 | 9.4 |
| b-Butyl alcohol | | | | 12.0 | | | | |
| Glycerol butyl ether | 2.0 | | | | | | | |
| Glycerol pentyl ether | 1.5 | | | 2.0 | 1.0 | 4.0 | 2.2 | 2.2 |
| Glycerol hexyl ether | | | 1.0 | | | | | |

EXAMPLE 2

To 500 grams of each of compositions Nos. 1 through 8 of Example 1, there was added 500 grams of the following reaction product. 61.5 grams of trimellitic anhydride, 42.6 of linseed fatty alcohol were added together in a reactor for 75 minutes at a temperature which varied between 103° C. and 120° C. Thereafter 26 grams of butyl Carbitol and 124 grams of linseed oil monoglycerides were added to the vessel. The contents in the vessel were raised to 170° C. within a 25-minute period and held at a temperature of between 170° C. and 175° C. for 15 hours. The resulting product was a fluid brown resin having an acid number of 52.8. To this liquid was added, after cooling the contents of the reaction vessel to 90° C., 16.8 grams of 2-amino-2-methyl-1-propanol. The resultant dispersion was transparent and had the appearance of a brilliant clear yellowish brown solution. In each instance it was possible to dilute the dispersions infinitely with water.

EXAMPLE 3

To 500 grams each of the solvent compositions 1 through 8 of Example 1 there was added 600 grams of a resin prepared by reacting 160 grams of an epoxide resin ("Epon Resin 1004") and 525 grams of tall oil fatty acids, which were charged to a heated reactor. The mixture was added in the reactor in an atmosphere of carbon dioxide at substantially atmospheric pressure to a temperature of 200° C. and held at this temperature until the acid value had dropped to 85. 150 grams of trimethylol ethane and 250 grams of dimethylol propionic acid were then added simultaneously to the reaction vessel, at which time the temperature of the contents in the vessel dropped to 175° C. Heating was continued for about 30 minutes during which time the temperature of the reaction mixture was raised to 200° C. 400 grams of phthalic anhydride were then added to the vessel and the heating was continued until the temperature of the contents reached 215° C. This temperature was maintained until a reaction produce having an acid value of 56 was obtained. The resin was removed from the flask and cooled to 90° C. prior to its dispersion in the various solvent compositions. The solvent compositions so prepared dried within a relatively short time when applied to wood or glass surfaces and formed tough, adhesive, transparent films which were resistant to acid and alkali attack.

EXAMPLE 4

To the resin dispersion described in Example 3 there was added with agitation at a temperature of about 75° C. 100 grams of dimethyl amino ethanol. Thereafter gaseous ammonia was sparged into the resin-solvent dispersion until 6 grams of ammonia had been reacted. The above mentioned dispersion was infinitely dilutable with water and a composition in which 50 grams of each dispersion were dispersed in a like amount of water were brushed on surfaces to produce films which dried within an 8-hour period. The films were clear, transparent coatings which were impervious to water, alkali and acid treatment. A second coating of resin was applied over the previously coated surfaces without lifting the original coating from the surface.

By way of contrast when the alkyl ethers of glycerol were omitted from the above dispersions and coatings made from such resin-solvent dispersions the original film, upon recoating with the dispersion lifted from the surface as the dispersions were brushed over it.

EXAMPLE 5

To 200 grams of the solvents 1 through 8, described in Example 1, there was added 200 grams of a reaction product prepared by heating and reaction 500 grams of trimellitic anhydride in 191 grams of ethylene glycol and 100 ml. of xylene at a temperature of 140° C. for 3½ hours. The water of esterification was removed azeotropically. The acid number of the reaction product was 257. To this mixture there was added and reacted 210 grams of allyl alcohol and 100 ml. of benzene at a temperature of 104° C. with stirring and the continuous azeotropic removal of water until a product having an acid number of 126 was produced. The final acid number of the product after the xylene, benzene and excess allyl alcohol were removed by a nitrogen purge was 180. To this solution was added 7.5 grams of 2-amino 2-methyl 1-propanol in 160 ml. of distilled water. The dispersions so produced were clear, transparent solutions, which after dilution with equal quantities of water and dried in air for eight hours produced hard, durable coatings.

When the alkyl ethers of glycerol was omitted from the resin-solvent dispersions at Example 5 a skin formed on the surface of the film as evidenced by its lack of transparency even after it finally dried.

EXAMPLE 6

A resin solvent dispersion was prepared as follows: 210 lbs. of the modified epoxy resin, described in Example 3, was added to 194 lbs. of solvent composition No. 2, described in Example 1, to provide a resin solvent dispersion containing 55.3% solid epoxy modified alkyd resin. To the resultant solution there was added 17½ lbs. of a 20 weight percent solution of potassium hydroxide which was thoroughly mixed with the resin solvent dispersion. Thereafter, there was added 10½ lbs. of a saturated aqueous solution of ammonium hydroxide to provide a water dispersible resin solvent dispersion, infinitely dilutable with water.

A pigment was prepared by intimately mixing 285 lbs. of rutile pigmentary titania, 70 lbs. calcium carbonate, 4 lbs. dehydrated castor oil, 4 lbs. of sodium dodecyl-benzene sulfonate, 5 lbs. of cobalt napthenate and 270 lbs. of water. The mixture was mixed in a conventional paint mixture until a smooth slurry was obtained. This slurry was added with agitation to the water dispersible resin solvent dispersion above described to provide a water based semi-gloss paint.

After about 5 minutes of standing, the paint was brushed out on a test board. It demonstrates an excellent ease of application and a viscosity which prevented the paint from dripping or running off of the brush. The paint coating air dried to semigloss white coating which had superior scrub resistance within 6 hours after drying (200 strokes with a wet rag in soap to eliminate marks made by lead pencil wax crayon and lipstick).

EXAMPLE 7

To one-half of the paint formulation prepared in Example 1 there was added and mixed pigmentary particles comprising 1.4 ounces of red iron oxide, .3 ounces of red toluidine toner (an Azo pigment coupling of meta-nitro-para-toluidine and beta-napthol) and 0.14 ounces of ferrite yellow oxide (hydrated ferric oxide). There was formed a red aqueous semi-gloss paint having the desirable properties described in Example 6.

Coatings of the paint formulations described in Examples 6 and 7 were brushed on test boards and permitted to dry for 6 hours after which a second coat of the respective paints was applied. The brushing characteristics of the characteristics of the paint coating were similar to those described in Example 6. However, a similar formulation was prepared in which the pentyl ether of glycerine was omitted and a paint coating made therefrom. An attempt to apply a second coat of paint to such original coating results in a "lift off" of the original paint coating.

The novel solvent compositions and resin-solvent dispersions of this invention, when employed in water reducible paint formulations provide paints in which the solvent evaporation is not dangerous in that the solvents are relatively non-toxic. Also coatings formed from such paint formulations dry evenly with a controllable moderate to high gloss, and when dry are tough, durable and resistant to water, acids and alkalis. The coatings can be "re-coated" or "coated-over" within a relatively short period after the initial coating has been applied without danger of lift-off of the original coating.

What is claimed is:

1. A water miscible solvent composition comprising (1) from about 60 to about 90 weight percent of a water soluble lower alkoxy lower alkanol; (2) from about 35 to about 9.5 weight percent of a lower aliphatic monohydric alcohol and (3) from about 0.5% to about 5.0%, by weight, of a compound of the formula

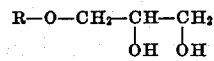

where R is an alkyl group containing from 3 to 6 carbon atoms.

2. A composition as in claim 1 wherein R is a pentyl group.

3. A composition as in claim 1 wherein the lower aliphatic monohydric alcohol is a mixture of isopropyl alcohol and n-propyl alcohol.

4. A composition as in claim 1 wherein the alkoxy group of the lower alkoxy lower alkanol contains from 1 to 5 carbon atoms and the lower alkanol group contains from 2 to 4 carbon atoms.

5. A composition as in claim 4 wherein the lower alkoxy lower alkanol is a mixture comprising a major proportion of n-propoxy propanol and a minor proportion of 3-ethoxy 1-propanol.

6. A solvent composition comprising (1) from about 60% to about 90%, by weight, of a lower alkoxy lower alkanol and from about 35% to about 9.5%, by weight, of a lower aliphatic alcohol, the balance of said composition consisting of a compound of the formula

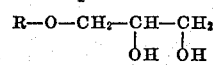

where R is an alkyl group containing from 3 to 6 carbon atoms.

7. A composition comprising from about 50% to about 60% by weight of n-propoxy propanol, from about 10% to about 30% by weight of 3-ethoxy-1-propanol, from about 35% to about 9.5% by weight of a mixture compromising n-propanol and isopropanol and from about 5.0% to about 0.5% by weight of a glyceryl ether of the formula

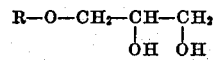

where R is an alkyl group of from 3 to 6 carbon atoms.

8. A composition as in claim 7 wherein R is a pentyl group.

9. A composition comprising from about 30% to about 75% by weight of an air-drying film-forming synthetic resin dispersed in for about 70% to about 30% by weight of a solvent comprising from about 60 to about 90 weight percent based on the weight of the solvent of a water soluble lower alkoxy lower alkanol from about 35% to about 9.5% basis the weight of the solvent of a lower aliphatic monohydric alcohol and from about 0.5% to about 5.0% by weight, based on the weight of the solvent, of a compound of the formula

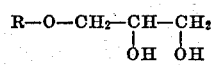

where R is an alkyl group containing from 3 to 6 carbon atoms.

10. A composition as in claim 9 wherein the synthetic resin is an alkyd resin.

11. A composition as in claim 10 wherein the alkyd resin is an epoxy modified alkyd resin.

12. A composition as in claim 11 wherein the epoxy modified alkyd resin is epoxy modified alkyd resin which has been at least partially neutralized with a water soluble alkaline compound.

13. A coating composition comprising a stable dispersion of from about 30% to about 70% by weight of an alkyd resin which has been at least partially neutralized with an aqueous solution of a water soluble alkaline compound and from about 70% to about 30% of a solvent comprising from about 60 to about 90 weight percent based on the weight of the solvent of a water soluble lower alkoxy lower alkanol from about 35% to about 9.5 weight percent, basis the weight of the solvent of a lower aliphatic monohydric alcohol and from about 0.5% to about 5% by weight, based on the weight of the solvent, of a compound of the formula

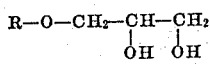

where R is an alkyl group containing from 3 to 6 carbon atoms.

14. A composition as in claim 13 wherein the alkyd resin is an epoxy modified alkyd resin.

15. A composition as in claim 14 wherein said composition additionally contains conventional pigments, fillers and toners.

16. A composition comprising a stable resin solvent dispersion comprising (A) from about 50% to about 75% by weight of an epoxy modified alkyd resin which has been at least partially neutralized with a water soluble alkaline compound and having an acid value of between 20 and 90, said alkyd resin being the reaction product obtained by reacting (1) from about 1% to about 25% by weight of a glyceryl polyether of a dihydric phenol and (2) from about 5% to about 60% by weight of a monocarboxylic fatty acid of a glyceride oil, thereby forming a reaction mixture comprising a partial ester of said polyether and said monocarboxylic fatty acid; reacting said reaction mixture with (3) from about 10% to about 50% by weight of a polycarboxylic acid, (4) from about 0.5% to about 1.0% mol, per mol of polycarboxylic acid, of a polyhydric alcohol and (5) from about 1.0% to about 0.5% mol, per mol of polycarboxylic acid of a hydroxyl substituted aliphatic acid of the formula

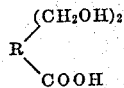

where $R_2$ is an alkylene group of from 1 to 4 carbon atoms and (B) from about 50% to about 25% by weight of a solvent composition comprising from about 50% to about 60% by weight of an n-propoxy propanol, from about 10% to about 30% by weight of (3) ethoxy-1-propanol, from about 35% to about 9.5% by weight of a mixture consisting essentially of n-propanol and isopropanol and from about 5.0% to about 0.5% by weight of a glycerol-ether of the formula

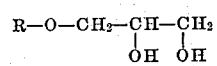

where R is an alkyl group of from 3 to 6 carbon atoms.

17. A composition as in claim 16 where the glycerol ether is pentyl-ether of glycerol.

References Cited

UNITED STATES PATENTS

| | | | |
|---|---|---|---|
| 2,887,459 | 5/1959 | Carmody | 260—22 |
| 3,027,341 | 3/1962 | Boucher et. al. | 260—22 |
| 3,120,499 | 2/1964 | Broadhead | 260—22 |
| 3,312,736 | 4/1967 | Ruhf | 260—75 |

FOREIGN PATENTS

| | | |
|---|---|---|
| 526,488 | 6/1956 | Canada. |
| 896,743 | 5/1962 | Great Britain. |

OTHER REFERENCES

Buttrey, Plasticizers, 2nd edition, 1957, p. 47 relied on.

DONALD E. CYAJA, *Primary Examiner.*

R. W. GRIFFIN, *Assistant Examiner.*

U.S. Cl. X.R.

106—188, 189, 196, 237, 244, 311; 117—124, 148, 161, 162, 166, 167, 168; 252—364; 260—29.2, 32.4, 32.6, 33.2, 33.4, 40